(12) United States Patent
Bamba

(10) Patent No.: US 8,908,991 B2
(45) Date of Patent: Dec. 9, 2014

(54) IMAGE PROCESSING APPARATUS, IMAGE PROCESSING METHOD AND STORAGE MEDIUM

(75) Inventor: Yasuo Bamba, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 84 days.

(21) Appl. No.: 13/482,824

(22) Filed: May 29, 2012

(65) Prior Publication Data

US 2012/0328152 A1    Dec. 27, 2012

(30) Foreign Application Priority Data

Jun. 22, 2011 (JP) ................. 2011-138892

(51) Int. Cl.
    *G06K 9/40*    (2006.01)
    *G06T 3/00*    (2006.01)

(52) U.S. Cl.
    CPC .................... *G06T 3/0062* (2013.01)
    USPC ........................................................ 382/275

(58) Field of Classification Search
    USPC ................. 382/103, 254, 274, 275, 299
    See application file for complete search history.

(56) References Cited

U.S. PATENT DOCUMENTS

| | | | |
|---|---|---|---|
| 7,778,534 B2 * | 8/2010 | Won et al. | 396/7 |
| 8,295,599 B2 * | 10/2012 | Katougi et al. | 382/173 |
| 8,310,550 B2 * | 11/2012 | Hayasaki | 348/207.2 |
| 2002/0024599 A1 | 2/2002 | Fukuhara et al. | |
| 2008/0152236 A1 | 6/2008 | Vendrig et al. | |
| 2010/0172543 A1 * | 7/2010 | Winkler | 382/104 |

FOREIGN PATENT DOCUMENTS

| | | |
|---|---|---|
| JP | 2002-064812 A | 2/2002 |
| JP | 2008-048443 A | 2/2008 |
| JP | 2008-165792 A | 7/2008 |
| JP | 2008-234169 A | 10/2008 |
| JP | 2009-211311 A | 9/2009 |

\* cited by examiner

*Primary Examiner* — Yon Couso
(74) *Attorney, Agent, or Firm* — Fitzpatrick, Cella, Harper & Scinto

(57) ABSTRACT

A high-resolution image obtained by an image sensing operation by an image sensing unit, and a low-resolution image having a resolution lower than the high-resolution image are acquired. An object which satisfies a predetermined condition is detected from the low-resolution image, and an object recognition processing for a region corresponding to the object in the high-resolution image is performed, thus correcting geometric distortions of the region.

25 Claims, 8 Drawing Sheets

IMAGE PROCESSING APPARATUS, IMAGE PROCESSING METHOD AND STORAGE MEDIUM

BACKGROUND OF THE INVENTION

1. Field of the Invention

The present invention relates to an image processing apparatus, image processing method, and storage medium, which are required to apply recognition processing to an image sensed by an image sensing device which can sense a broad-range image.

2. Description of the Related Art

A method of sensing a broad-range image at once compared to an image sensing device having a normal field angle using a broad-range image sensing device such as a fish-eye lens or omni-directional mirror is known. Japanese Patent Laid-Open Nos. 2008-048443 and 2002-064812 disclose a technique for detecting a moving object from an image sensed by such broad-range image sensing device, and automatically deciding and tracing that moving object extraction region. In these patent literatures, distortions are removed from the moving object by correcting the distortions caused by the image sensing device.

When the omni-directional mirror is used as the broad-range image sensing device, panoramic extension and perspective projection extension are popularly used as an image distortion correction method. The panoramic extension is a method which assumes a virtual column around the omni-directional mirror, and projects a broad-range image onto the side surface of the column. The perspective projection extension is a method which assumes a vertical plane from a focal point of the omni-directional mirror in a certain visual axis direction, and projects a broad-range image onto the vertical plane. Also, Japanese Patent Laid-Open No. 2008-165792 discloses a technique for moving object detection. Furthermore, Japanese Patent Laid-Open Nos. 2009-211311 and 2008-234169 disclose a technique for object recognition such as human body detection and face detection.

There are needs for applying object recognition processing such as human body detection, face detection, or face recognition to an image (broad-range image) sensed by a broad-range image sensing device. An existing object recognition method is designed to be applied to an image sensed by an image sensing device having a normal field angle. For this reason, in order to apply such object recognition to a broad-range image, processing for correcting image distortions caused by the broad-range image sensing device has to be executed as pre-processing.

On the other hand, a resolution of image sensors used in the broad-range image sensing device is increasingly enhanced. For this reason, when the aforementioned pre-processing is applied to an image sensed by such broad-range image sensing device, a processing volume required for this pre-processing increases compared to the conventional device, and real-time object recognition cannot be done at a high frame rate.

SUMMARY OF THE INVENTION

The present invention has been made in consideration of the above problems, and provides a technique that allows to apply real-time object recognition to a high-resolution image.

In order to achieve the object of the present invention, for example, an image processing apparatus of the present invention comprises: an acquisition unit that acquires a high-resolution image obtained by an image sensing operation by an image sensing unit, and a low-resolution image having a resolution lower than the high-resolution image; a detection unit that detects an object which satisfies a predetermined condition from the low-resolution image acquired by the acquisition unit; a recognition unit that performs an object recognition processing for a region, which corresponds to the object, in the high-resolution image acquired by the acquisition unit; and a correction unit that corrects geometric distortions of the region.

With the arrangement of the present invention, real-time object recognition can be applied to a high-resolution image.

Further features of the present invention will become apparent from the following description of exemplary embodiments (with reference to the attached drawings).

DESCRIPTION OF THE EMBODIMENTS

Embodiments of the present invention will be described hereinafter with reference to the accompanying drawings. Embodiments to be described hereinafter are examples when the present invention is specifically practiced, and are specific embodiments of the arrangement described in the scope of the claims.

[First Embodiment]

Figure 1:
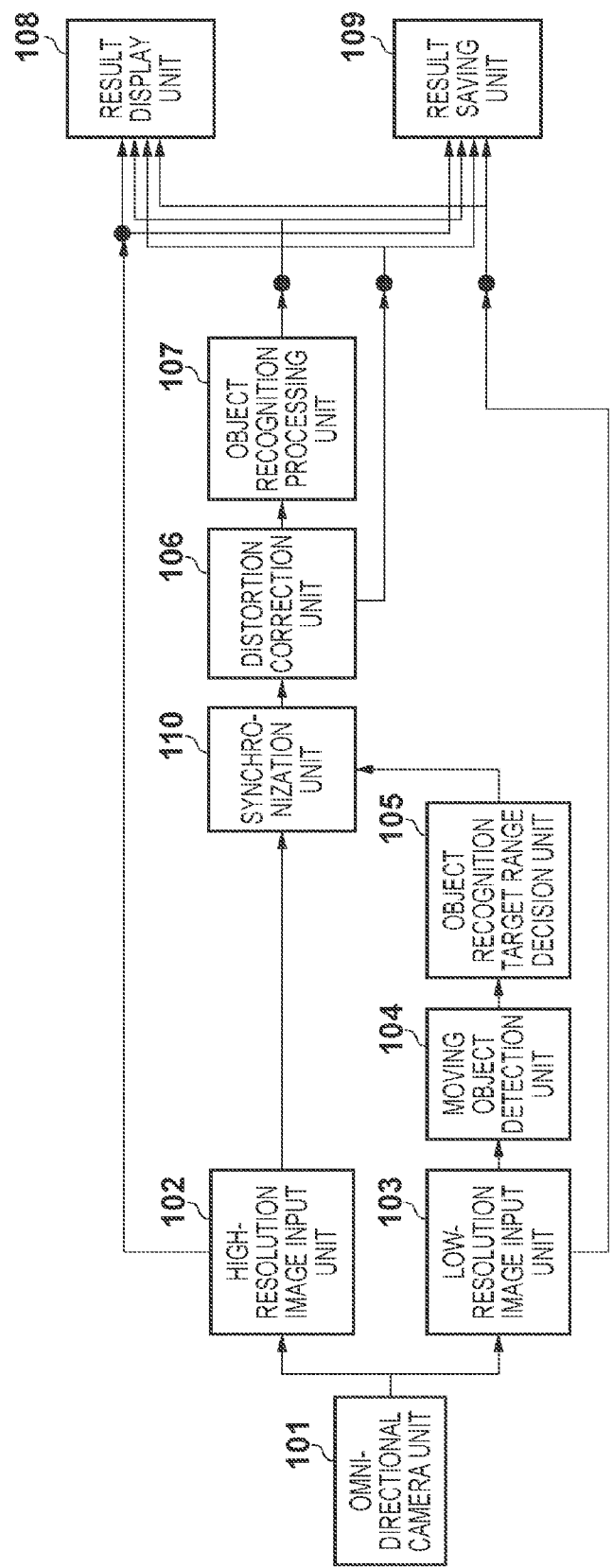
FIG. 1 is a block diagram showing an example of the functional arrangement of an image sensing system.

A functional arrangement example of an image sensing system to which an image processing apparatus according to this embodiment is applied will be described first with reference to the block diagram shown in FIG. 1. An omni-directional camera unit 101 is a camera which can sense a wide-angle image at once by combining a camera and a mirror having a circular hyperboloidal shape. As the mirror, an omni-directional mirror having a circular paraboloidal or conical shape may be used. Note that the omni-directional camera unit 101 may be an image sensing device using a fish-eye lens or a device which composites images from a plurality of image sensing devices. That is, the omni-directional camera unit 101 may have an arbitrary arrangement as long as it can input a surrounding image (moving image) at once. Since a sensed image obtained by the omni-directional camera unit 101 includes geometric distortions, distortion correction processing is normally required.

The omni-directional camera unit 101 has a function of sequentially outputting images (broad-range images) of respective frames sensed by such arrangement, and outputting images having a lower resolution than the sensed images. That is, the omni-directional camera unit 101 is an image sensing device, which can perform omni-directional image sensing operations, and that which outputs sensed images as high-resolution images, and also outputs low-resolution images as those having a lower resolution than the high-resolution images.

A low-resolution image can be output by selecting image sensors at appropriate intervals (coarse intervals) from an image sensor group included in the omni-directional camera unit 101, and reading out pixels from the selected image sensors. On the other hand, a high-resolution image can be output by reading out pixels from all image sensors included in the omni-directional camera unit 101. A low-resolution image can also be generated from a high-resolution image by an algorithm such as a bilinear method in addition to simple pixel decimation. Thus, for example, the omni-directional camera unit 101 can output high-resolution images each having a resolution of m pixels×n pixels, and also low-resolution images each having a resolution of (m/2) pixels×(n/2) pixels. For this reason, the omni-directional camera unit 101 outputs low-resolution images at intervals shorter than output intervals of high-resolution images.

Note that the omni-directional camera unit 101 outputs each sensed high-resolution image after it appends metadata including a resolution and image sensing timing to the image. Also, the omni-directional camera unit 101 outputs each low-resolution image after it appends metadata including a resolution and image sensing timing to the image.

A high-resolution image input unit 102 acquires high-resolution images sequentially output from the omni-directional camera unit 101, and sequentially outputs the acquired high-resolution images to a synchronization unit 110. Also, these high-resolution images may be output to a result display unit 108 and result saving unit 109 as needed.

A low-resolution image input unit 103 acquires low-resolution images sequentially output from the omni-directional camera unit 101, and sequentially outputs the acquired low-resolution images to a moving object detection unit 104. Also, these low-resolution images may be output to the result display unit 108 and result saving unit 109 as needed.

The moving object detection unit 104 detects an object, which satisfies predetermined conditions, from each low-resolution image acquired from the low-resolution image input unit 103. Detection of an object which satisfies the predetermined conditions includes, for example, that of a moving object. A moving object can be detected using, for example, a method of separating a foreground and background using a background subtraction method, and detecting a foreground object as a moving object. Of course, the moving object detection method is not limited to this. Detection of an object which satisfies the predetermined conditions includes, for example, object detection such as human body detection, face detection, and face recognition. Note that a recognition target is not limited to a human body or face as long as an object type is discriminated using feature amounts of an image.

Upon reception of the low-resolution images from the moving object detection unit 104, an object recognition target range decision unit 105 decides a region including the object detected by the moving object detection unit 104 as an object region in each of the low-resolution images. Then, the object recognition target range decision unit 105 outputs the low-resolution images, and information indicating the decided object regions (object recognition target ranges) to the synchronization unit 110.

The synchronization unit 110 acquires the high-resolution images from the high-resolution image input unit 102, and acquires the low-resolution images and object recognition target ranges from the object recognition target range decision unit 105. As described above, the omni-directional camera unit 101 outputs the low-resolution images at intervals shorter than the output intervals of the high-resolution images. Therefore, the synchronization unit 110 acquires the low-resolution images and object recognition target ranges from the object recognition target range decision unit 105 at intervals shorter than the acquisition intervals of the high-resolution images from the high-resolution image input unit 102. Then, when the synchronization unit 110 acquires the low-resolution images and object recognition target ranges from the object recognition target range decision unit 105, it stores the acquired low-resolution images and object recognition target ranges in an internal memory of the apparatus as sets.

When the synchronization unit 110 acquires a high-resolution image (high-resolution image of interest) from the high-resolution image input unit 102, it refers to an image sensing timing in metadata appended to this high-resolution image of interest. Then, the synchronization unit 110 reads out, from the memory, an object recognition target range which is stored in the memory as a set with a low-resolution image appended with metadata including an image sensing timing closest to that image sensing timing. The synchronization unit 110 then outputs the readout object recognition target range and this high-resolution image of interest as a set to a distortion correction unit 106.

The distortion correction unit 106 specifies a region corresponding to the object recognition target range received from the synchronization unit 110 in the high-resolution image received from the synchronization unit 110. The distortion correction unit 106 applies distortion correction processing required to correct geometric distortions caused by the omni-directional camera unit 101 to the specified region. In this manner, the distortion correction unit 106 generates an image in which this region is corrected to a rectangular region as a distortion corrected image by applying the distortion correction processing to the specified region. Then, the distortion correction unit 106 outputs this distortion corrected image to an object recognition processing unit 107.

The object recognition processing unit 107 applies, to the distortion corrected image received from the distortion correction unit 106, processing for recognizing an object in that distortion corrected image. This object recognition includes, for example, object recognition such as human body detection, face detection, and face recognition. Note that a recognition target is not limited to a human body or face as long as an object type is discriminated using feature amounts of an image. Then, the object recognition processing unit 107 outputs information associated with the recognition result, for example, the recognized object, to the result display unit 108 and result saving unit 109.

The result display unit 108 includes a display device such as a CRT or liquid crystal screen. The result display unit 108 can display the high-resolution images output from the high-resolution image input unit 102, the low-resolution images output from the low-resolution image input unit 103, the distortion corrected images generated by the distortion correction unit 106, the recognition result by the object recognition processing unit 107, and the like. What kind of information is to be acquired and how to display that information are not particularly limited. For example, information associated with a recognized object may be superimposed on a high-resolution image. Of course, display contents may be switched.

The result saving unit 109 includes a memory device such as a hard disk drive or portable memory. The result saving unit 109 can save the high-resolution images output from the high-resolution image input unit 102, the low-resolution images output from the low-resolution image input unit 103, the distortion corrected images generated by the distortion correction unit 106, the recognition result by the object recognition processing unit 107, and the like. For example, the recognition result may be saved in the result saving unit 109 as metadata. What kind of information is to be acquired and how to save that information are not particularly limited.

Figure 2:
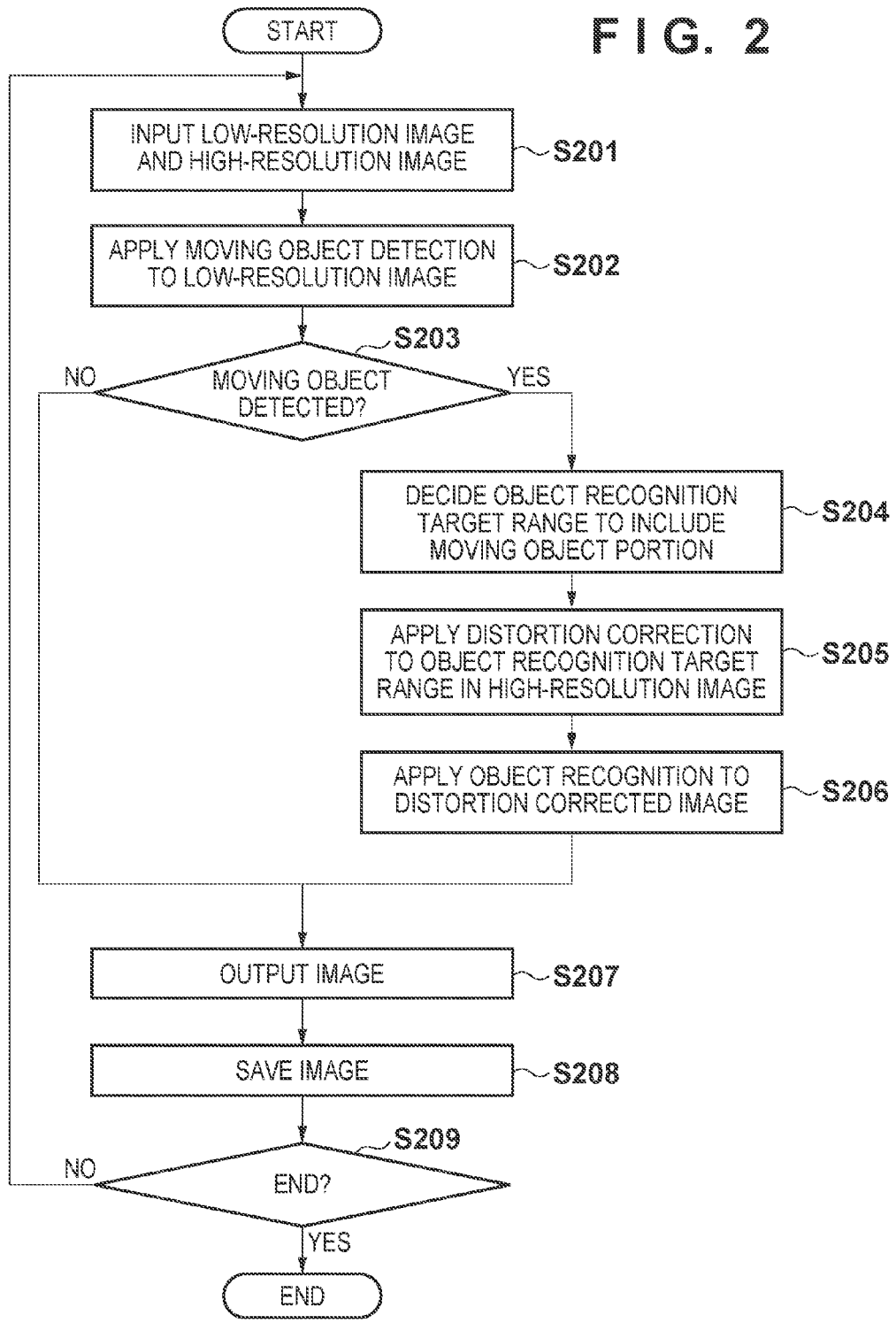
FIG. 2 is a flowchart of the operations of respective units except for an omni-directional camera unit 101.

The operations of the respective units except for the omni-directional camera unit 101 will be described below with reference to the flowchart shown in FIG. 2. In step S201, the high-resolution image input unit 102 acquires a high-resolution image output from the omni-directional camera unit 101, and the low-resolution image input unit 103 acquires a low-resolution image output from the omni-directional camera unit 101.

Figure 3:
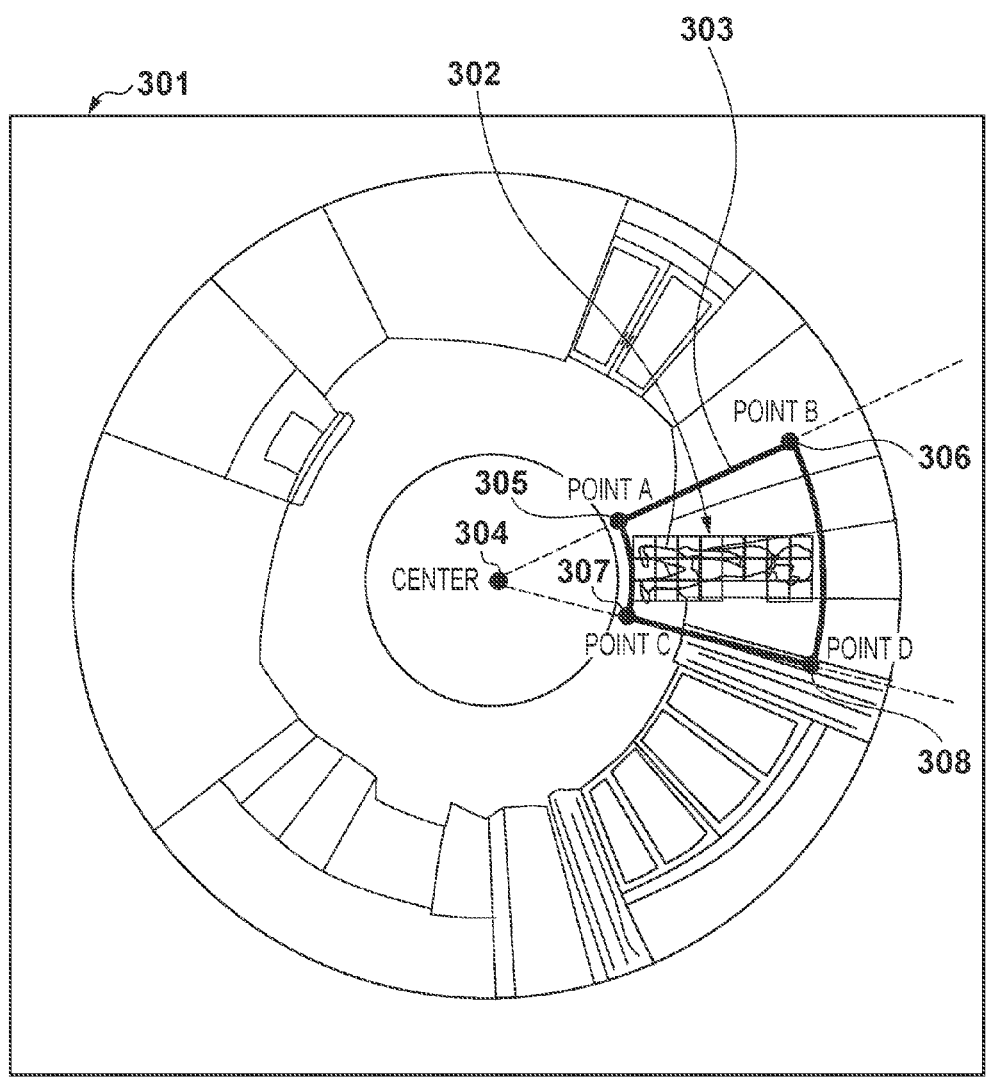
FIG. 3 is a view for explaining an object detection result 302 and object recognition target range 303.

In step S202, the moving object detection unit 104 detects an object (moving object) from the low-resolution image acquired from the low-resolution image input unit 103. Moving object detection will be described below with reference to FIG. 3. Referring to FIG. 3, when an image sensing device using a rotary mirror (to be referred to as an omni-directional camera hereinafter) is used as the omni-directional camera unit 101, a low-resolution image 301 is sensed using this image sensing device. When such high-resolution image 301 is acquired in step S201, the moving object detection unit 104 detects an object indicated by an object detection result 302 in step S202.

If an object is detected in step S202, the process advances to step S204 via step S203; otherwise, the process jumps to step S207 via step S203.

In step S204, when the object recognition target range decision unit 105 receives the low-resolution image from the moving object detection unit 104, it decides a region including the object detected by the moving object detection unit 104 in this low-resolution image as an object region. Decision of the object region will be described below with reference to FIG. 3.

The object recognition target range decision unit 105 decides an object recognition target range 303 as a region (object region) including the object detection result 302. This object recognition target range 303 is required to have a shape which is corrected to a rectangular shape by the distortion correction unit 106. In case of FIG. 3, since the low-resolution image 301 is sensed by the omni-directional camera unit 101, the object recognition target range 303 has a fan shape, as shown in FIG. 3. This object recognition target range 303 is defined by two lines which pass a central position 304 of the low-resolution image 301 and sandwich the object detection result 302, and arcs of two circles having the central position 304 as the center. When the object recognition target range 303, which is set in this way, undergoes the distortion correction processing by the distortion correction unit 106, its shape is corrected to a rectangular shape. The object recognition target range 303 may be decided to include a blank portion at a given ratio with respect to the size of the object detection result 302 or that having a given size irrespective of the size of the object detection result 302.

In case of FIG. 3, the object recognition target range 303 can be defined by coordinate positions of points A 305, B 306, C 307, and D 308, and the central position 304. For this reason, the object recognition target range decision unit 105 outputs information of these positions to the synchronization unit 110 as the object recognition target range.

Note that when the object recognition target range 303 does not have a simple shape unlike in FIG. 3, the object recognition target range decision unit 105 outputs coordinate positions of respective points on a frame of the object recognition target range 303 to the synchronization unit 110 as the object recognition target range.

Then, the object recognition target range decision unit 105 outputs the low-resolution image received from the moving object detection unit 104 and the decided object recognition target range to the synchronization unit 110. The synchronization unit 110 acquires a high-resolution image from the high-resolution image input unit 102, and acquires the low-resolution image and object recognition target range from the object recognition target range decision unit 105. When the synchronization unit 110 acquires a high-resolution image (high-resolution image of interest) from the high-resolution image input unit 102, it refers to an image sensing timing in metadata appended to this high-resolution image of interest. The synchronization unit 110 reads out, from the memory, an object recognition target range stored in the memory as a set with a low-resolution image appended with metadata including an image sensing timing closest to this image sensing timing. The synchronization unit 110 outputs the readout object recognition target range and this high-resolution image of interest as a set to the distortion correction unit 106.

In this manner, the synchronization unit 110 selects a low-resolution image sensed at the image sensing timing corresponding to that of the high-resolution image. Then, the synchronization unit 110 decides the low-resolution image corresponding to the high-resolution image. The above example has explained the case in which a low-resolution image appended with metadata including an image sensing timing closest to that of the high-resolution image of interest is associated with the high-resolution image of interest. However, the association method is not limited to this. For example, a low-resolution image may be selected from those which were sensed within a predetermined time range from the image sensing timing of the high-resolution image of interest.

Figure 4:
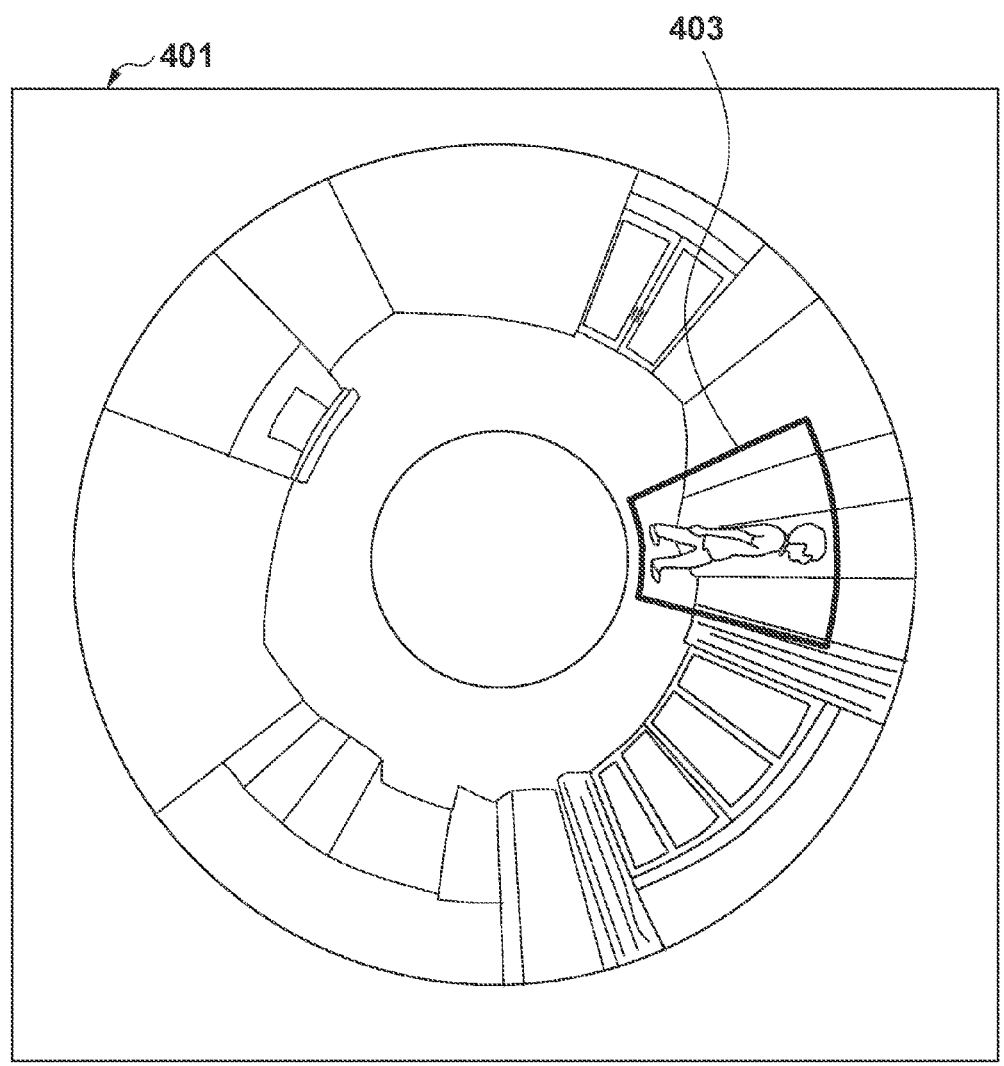
FIG. 4 is a view for explaining distortion correction processing by a distortion correction unit 106.

In step S205, the distortion correction unit 106 specifies a region corresponding to the object recognition target range in the high-resolution image received from the synchronization unit 110, and applies, to the specified region, the distortion correction processing required to correct geometric distortions caused by the omni-directional camera unit 101. The distortion correction processing by the distortion correction unit 106 will be described below with reference to FIG. 4. Upon reception of a high-resolution image 401 from the synchronization unit 110, the distortion correction unit 106 sets a region corresponding to the object recognition target range 303 received from the synchronization unit 110 as an object recognition target range 403. For example, when the high-resolution image 401 has a resolution of m pixels×n pixels, and the low-resolution image 301 has a resolution of (m/2) pixels×(n/2) pixels, the object recognition target range 403 is formed by doubling X- and Y-coordinate values included in the object recognition target range 303.

Figure 5:
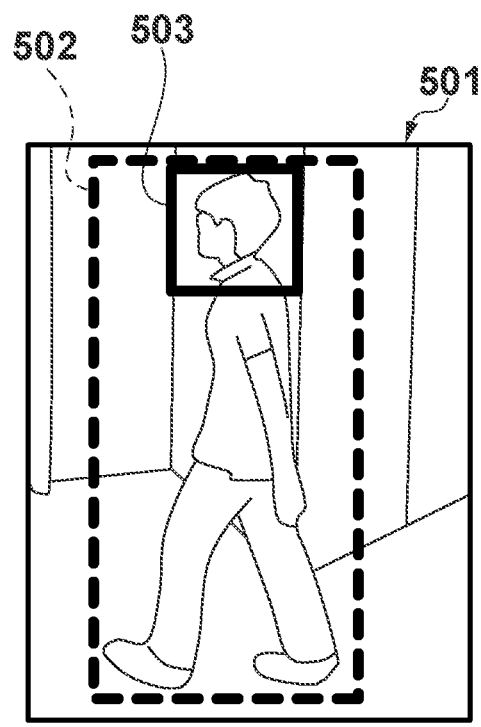
FIG. 5 is a view for explaining recognition processing by an object recognition processing unit 107.

Then, the distortion correction unit 106 applies the distortion correction processing to the object recognition target range 403 obtained in this way, thereby generating an image in which this object recognition target range 403 is corrected to a rectangular range as a distortion corrected image. The distortion correction can be applied in consideration of the characteristics of the omni-directional camera unit 101. This embodiment adopts a method of obtaining a distortion corrected image using panoramic extension. However, the distortion corrected image generation method is not limited to this method, and perspective projection extension may be used. In this manner, the distortion correction unit 106 executes the distortion correction processing for correcting distortions of the shape of an image in the region corresponding to the object recognition target range 403 in the high-resolution image 401. FIG. 5 shows an example of a distortion corrected image 501 generated as a result of execution of the distortion correction processing of the distortion correction unit 106.

In step S206, the object recognition processing unit 107 applies, to the distortion corrected image received from the distortion correction unit 106, processing for recognizing an object in the distortion corrected image. This recognition processing will be described below with reference to FIG. 5. When a distortion corrected image 501 shown in FIG. 5 is obtained from the distortion correction unit 106, and when the object recognition processing unit 107 applies human body detection to this distortion corrected image 501, a human body recognition result 502 indicating a region of a human body is obtained. When the object recognition processing unit 107 applies face detection to this distortion corrected image 501, a face detection result 503 indicating a face region is obtained. Then, the object recognition processing unit 107 outputs the recognition result to the result display unit 108 and result saving unit 109 as metadata.

In step S207, the result display unit 108 displays one or more of the high-resolution image, low-resolution image, distortion corrected image, and recognition result. For example, the result display unit 108 displays a high-resolution image after it gives frames to recognized target regions in the high-resolution image. Note that when frames are given to regions on a high-resolution image (low-resolution image) corresponding to the recognized or detected regions (502, 503), they have to be given to regions obtained by applying inverse processing of the aforementioned distortion correction processing to the recognized or detected regions.

Figure 6:
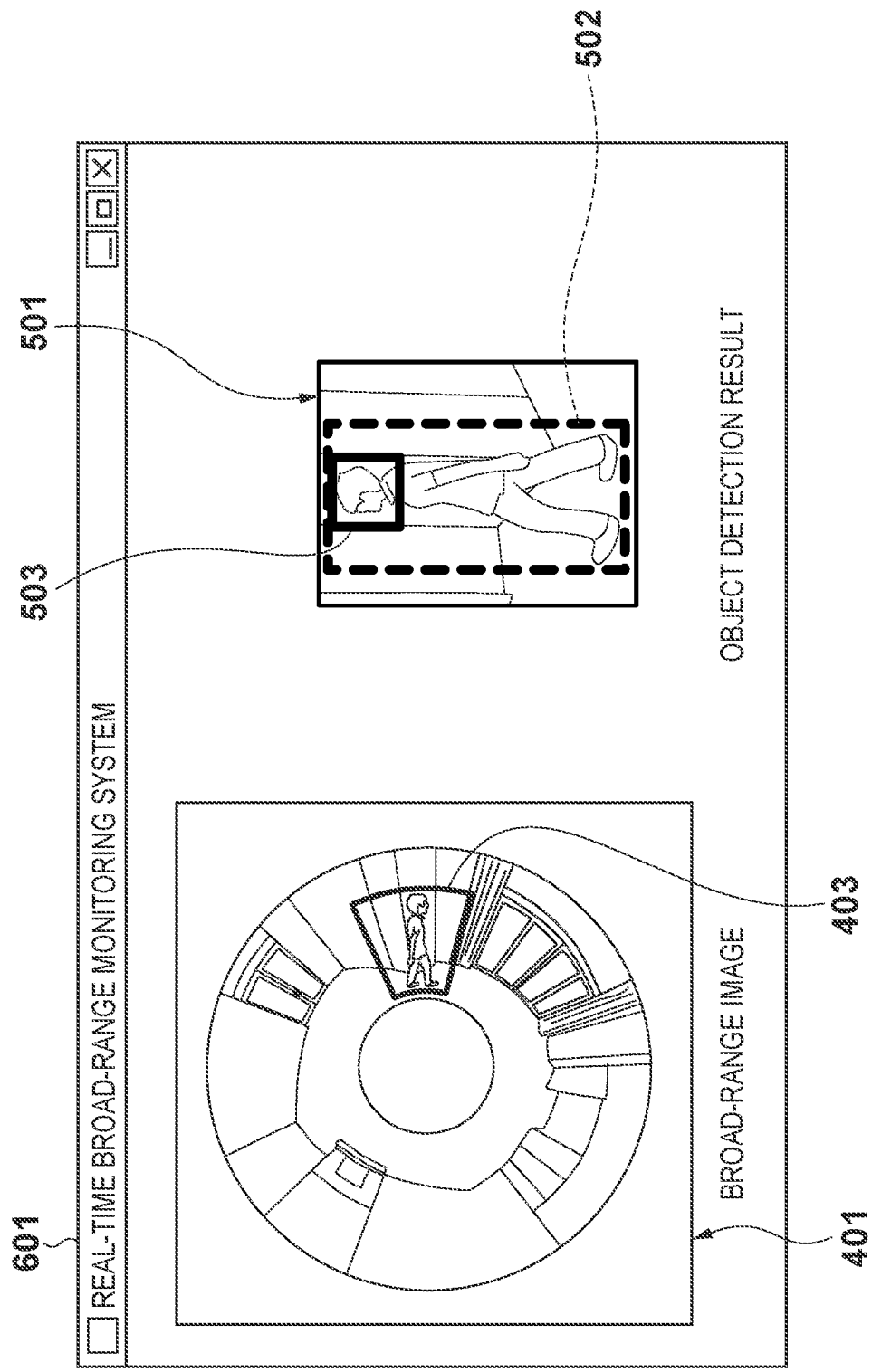
FIG. 6 is a view showing a display example by a result display unit 108.

FIG. 6 shows a display example of the result display unit 108. In FIG. 6, the high-resolution image 401 is displayed on the left side of a display window 601, and the frame of the object recognition target range 403 is displayed on this high-resolution image 401. The distortion corrected image 501 is displayed on the right side of the display window 601, and the frames indicating the human body recognition result 502 and face detection result 503 are displayed on this distortion corrected image 501.

In step S208, the result saving unit 109 saves the high-resolution image from the high-resolution image input unit 102, the low-resolution image from the low-resolution image input unit 103, the distortion corrected image generated by the distortion correction unit 106, the recognition result by the object recognition processing unit 107, and the like.

Then, when it is detected that prescribed end conditions are satisfied (for example, an end instruction input by the user by operating an operation unit (not shown) is detected), the process ends via step S209. On the other hand, when it is not detected that the prescribed end conditions are satisfied, the process returns to step S201 via step S209.

Note that output destinations of the high-resolution image, low-resolution image, distortion corrected image, and recognition result are not limited to the result display unit 108 and result saving unit 109. For example, these images and result may be transmitted to an external apparatus via a network.

This embodiment has explained the case in which after the distortion correction processing for correcting distortions of the shape of an image in the region corresponding to the object recognition target range 403 is executed in the high-resolution image 401, the recognition processing is executed in the high-resolution image. However, after the recognition processing may be applied in the object region in the high-resolution image, the correction processing may be executed.

As described above, according to the invention of this embodiment, compared to a case in which distortion correction processing of an image is applied to an entire high-resolution image, a processing volume can be reduced. Therefore, according to the invention of this embodiment, real-time object recognition can be implemented even in a high-resolution image.

[Second Embodiment]

Figure 7:
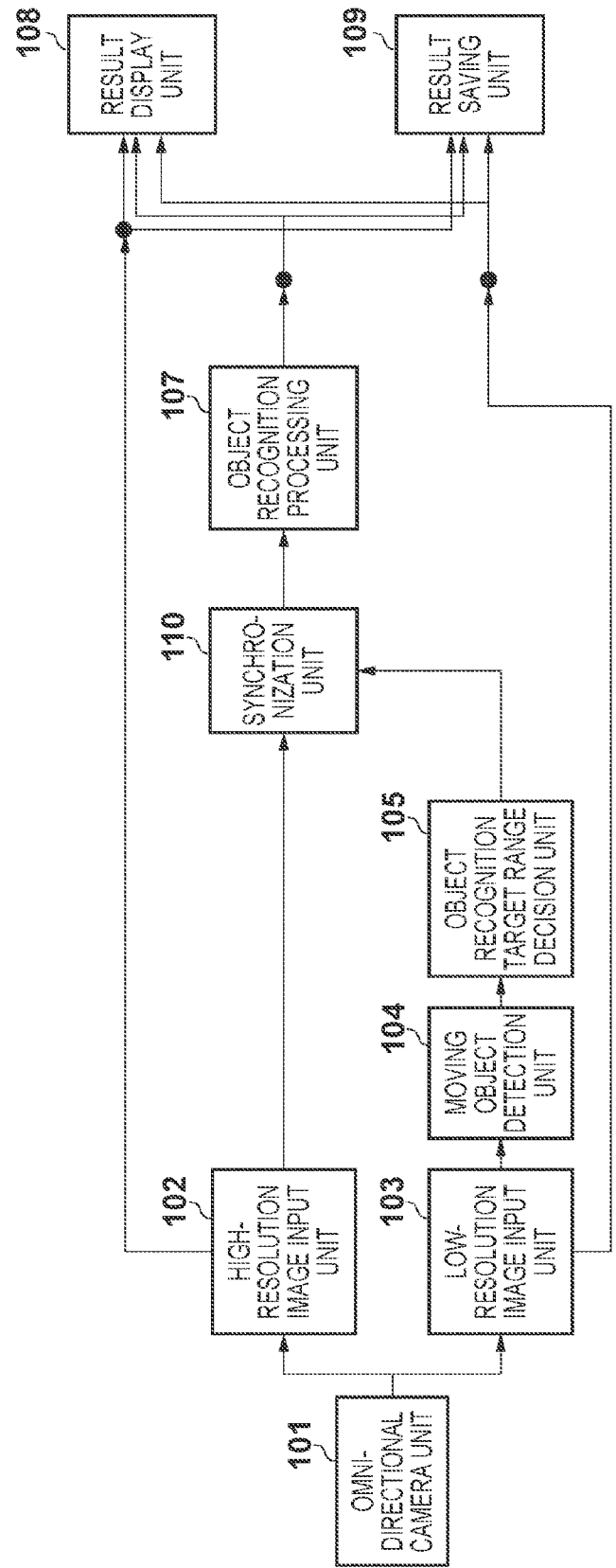
FIG. 7 is a block diagram showing an example of the functional arrangement of an image sensing system.

A functional arrangement example of an image sensing system to which an image processing apparatus according to this embodiment is applied will be described below with reference to the block diagram shown in FIG. 7. The arrangement shown in FIG. 7 is the same as that shown in FIG. 1, except that the distortion correction unit 106 is omitted from the arrangement shown in FIG. 1, and the omni-directional camera unit 101 is a camera including a fish-eye lens. A description about the same part as in the first embodiment will not be repeated, and only differences from the first embodiment will be explained below.

The omni-directional camera unit 101 according to this embodiment has the same functions as that according to the first embodiment, except that it is a camera including a fish-eye camera. That is, the omni-directional camera unit 101 of this embodiment is also an image sensing device which can perform omni-directional image sensing operations, and that which outputs sensed images as high-resolution images, and also outputs low-resolution images as those having a lower resolution than the high-resolution images. Also, the omni-directional camera unit 101 outputs each sensed high-resolution image after it appends metadata including a resolution and image sensing timing to the image. Furthermore, the omni-directional camera unit 101 according to this embodiment outputs each low-resolution image after it appends metadata including a resolution and image sensing timing to the image.

The object recognition processing unit 107 specifies a region corresponding to an object recognition target range received from the synchronization unit 110 in a high-resolution image received from the synchronization unit 110. This region specifying method is the same as that in the first embodiment. Then, the object recognition processing unit 107 applies processing for recognizing an object in the specified region to that region.

Figure 8:
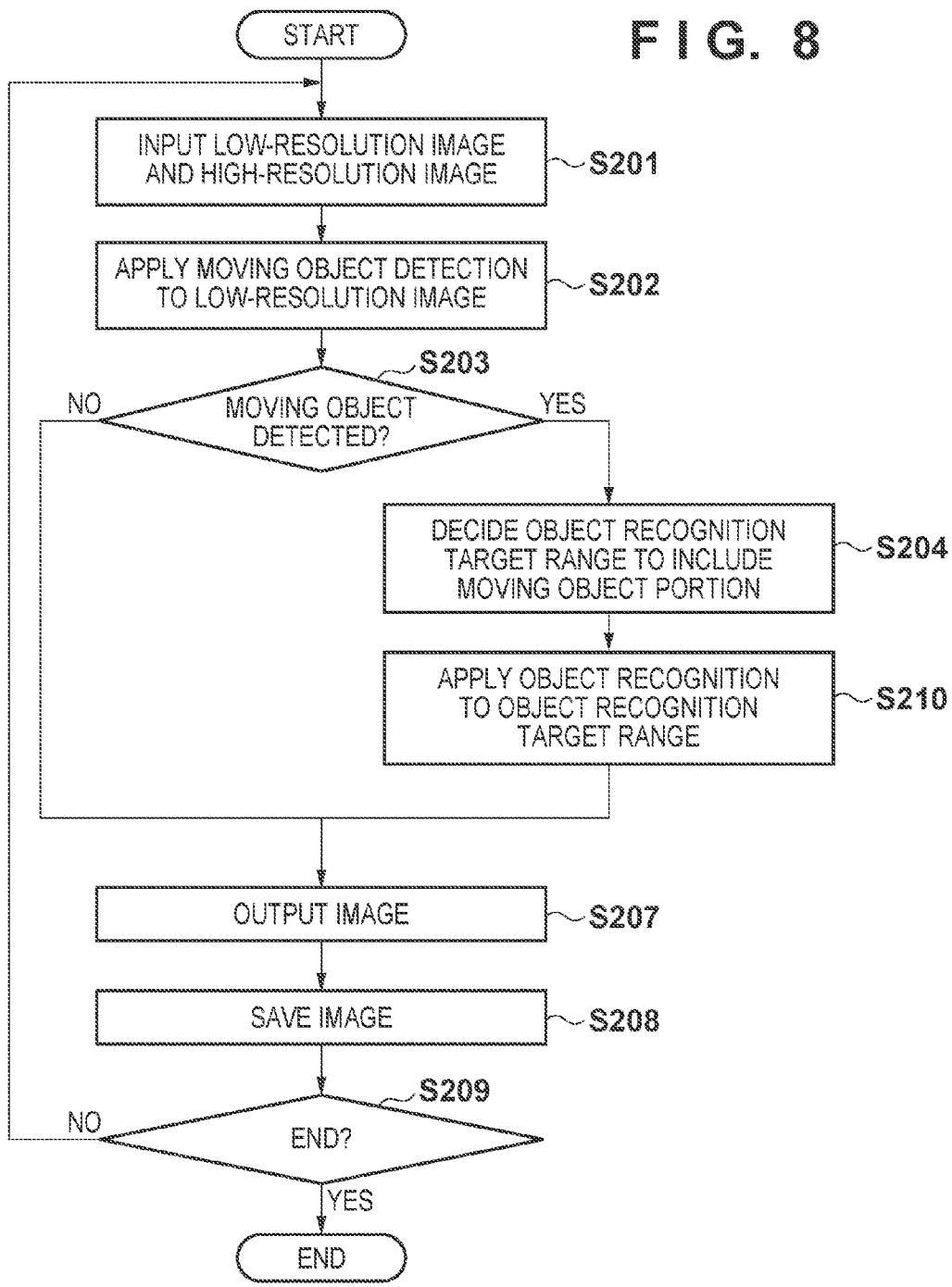
FIG. 8 is a flowchart of the operations of respective units except for an omni-directional camera unit 101.

The operations of the respective units except for the omni-directional camera unit 101 will be described below with reference to the flowchart shown in FIG. 8. The same step numbers in FIG. 8 denote the same processing steps as in FIG. 2, and a description thereof will not be repeated.

In step S210, the object recognition processing unit 107 specifies a region corresponding to an object recognition target range received from the synchronization unit 110 in a high-resolution image received from the synchronization unit 110. Then, the object recognition processing unit 107 applies processing for recognizing an object in this specified region to that region.

According to the invention of this embodiment, compared to a case in which distortion correction processing of an image is applied to an entire high-resolution image, a processing volume can be reduced as in the first embodiment. According to the invention of this embodiment, real-time object recognition can be implemented even in a high-resolution image.

[Third Embodiment]

The above embodiments have explained the recognition processing using high- and low-resolution images which are directly acquired from the omni-directional camera unit 101. However, the arrangement of the system is not limited to this.

For example, an embodiment in which high-resolution images of respective frames sensed by the omni-directional camera unit 101 and low-resolution images may be stored in advance in a hard disk drive or server apparatus is available. In this case, the high-resolution image input unit 102 and low-resolution image input unit 103 respectively acquire high- and low-resolution images from the hard disk drive or server apparatus via a wired or wireless network.

As described above, various acquisition sources of high- and low-resolution images may be used, and the acquisition methods of respective images are not limited to the specific method.

According to the invention of this embodiment, compared to a case in which distortion correction processing of an image is applied to an entire high-resolution image, a processing volume can be reduced as in the first embodiment. According to the invention of this embodiment, real-time object recognition can be implemented even in a high-resolution image.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-138892, filed Jun. 22, 2011 which is hereby incorporated by reference herein in its entirety.

What is claimed is:

1. An image processing apparatus comprising:
an acquisition unit that acquires a high-resolution image obtained from a broad-range image sensing unit, and a low-resolution image which corresponds to the high-resolution image and has a resolution lower than the high-resolution image, wherein each of the high-resolution image and the low-resolution image contains geometric distortions;
a detection unit that detects an object in the low-resolution image;
a decision unit that decides a region including the detected object within the low-resolution image as an object region and decides a region corresponding to the object region within the high-resolution image as a target region;
a correction unit that corrects the geometric distortion of a partial image being an image of the target region, within the high-resolution image; and
a recognition unit that performs an object recognition processing for the partial image of which the geometric distortion has been corrected.

2. The apparatus according to claim 1, wherein said detection unit detects the object in the low-resolution image sensed at an image sensing timing corresponding to an image sensing timing of the high-resolution image acquired by said acquisition unit.

3. The apparatus according to claim 1, wherein said acquisition unit acquires the low-resolution image by decimating pixels from the high-resolution image.

4. The apparatus according to claim 1, wherein the broad-range image sensing unit has an omni-directional mirror having a circular hyperboloidal, circular paraboloidal, or conical shape, or a fish-eye lens.

5. An image processing method executed by an image processing apparatus, comprising:
an acquisition step of acquiring, by a processor of the image processing apparatus, a high-resolution image obtained from a broad-range image sensing unit, and a low-resolution image which corresponds to the high-resolution image and has a resolution lower than the high-resolution image, wherein each of the high-resolution image and the low-resolution image contains geometric distortions;
a detection step of detecting, by the processor of the image processing apparatus, an object in the low-resolution image;
a decision step of deciding, by the processor of the image processing apparatus, a region including the detected object within the low-resolution image as an object region and deciding a region corresponding to the object region within the high-resolution image as a target region;
a correction step of correcting, by the processor of the image processing apparatus, the geometric distortion of a partial image being an image of the target region, within the high-resolution image; and
a recognition step of performing, by the processor of the image processing apparatus, an object recognition processing for the partial image of which the geometric distortion has been corrected.

6. The method according to claim 5, wherein in the detection step, the object is detected, by the processor of the image processing apparatus, in the low-resolution image sensed at an image sensing timing corresponding to an image sensing timing of the high-resolution image.

7. The method according to claim 5, wherein in the acquisition step, the low-resolution image is acquired, by processor of the the image processing apparatus, by decimating pixels from the high-resolution image.

8. A non-transitory computer-readable storage medium storing a program for controlling a computer to execute:
an acquisition step of acquiring, by a processor of an image processing apparatus, a high-resolution image obtained from a broad-range image sensing unit, and a low-resolution image which corresponds to the high-resolution image and has a resolution lower than the high-resolution image, wherein each of the high-resolution image and the low-resolution image contains geometric distortions;
a detection step of detecting, by the processor of the image processing apparatus, an object in the low-resolution image;
a decision step of deciding, by the processor of the image processing apparatus, a region including the detected object within the low-resolution image as an object region and decides a region corresponding to the object region within the high-resolution image as a target region;
a correction step of correcting, by the processor of the image processing apparatus, the geometric distortion of a partial image being an image of the target region, within the high-resolution image; and a recognition step of performing, by the processor of the image processing apparatus, an object recognition processing for the partial image of which the geometric distortion has been corrected.

9. The medium according to claim 8, wherein in the detection step, the object is detected in the low-resolution image sensed at an image sensing timing corresponding to an image sensing timing of the high-resolution image.

10. The medium according to claim 8, wherein in the acquisition step, the low-resolution image is acquired by decimating pixels from the high-resolution image.

11. The apparatus according to claim 1, wherein said detection unit detects a moving object in the low-resolution image.

12. The apparatus according to claim 1, wherein said correction unit converts the partial image having a fan shape, into a partial image having a rectangular shape.

13. An image processing apparatus comprising:

an acquisition unit that acquires a high-resolution image obtained from a broad-range image sensing unit, and a low-resolution image which corresponds to the high-resolution image and has a resolution lower than the high-resolution image, wherein each of the high-resolution image and the low-resolution image contains geometric distortions;

a detection unit that detects an object in the low-resolution image;

a decision unit that decides a region including the detected object within the low-resolution image as an object region and decides a region corresponding to the object region within the high-resolution image as a target region; and a correction unit that extracts an image of a region, from the partial image of which the geometric distortion has been corrected.

14. The apparatus according to claim 13, wherein said correction unit converts the partial image, having a fan shape, into a partial image having a rectangular shape.

15. An image processing method executed by an image processing apparatus comprising:

an acquisition step of acquiring, by a processor of the image processing apparatus, a high-resolution image obtained from a broad-range image sensing unit, and a low-resolution image which corresponds to the high-resolution image and has a resolution lower than the high-resolution image, wherein each of the high-resolution image and the low-resolution image contains geometric distortions;

a detection step of detecting, by the processor of the image processing apparatus, an object in the low-resolution image;

a decision step of deciding, by the processor of the image processing apparatus, a region including the detected object within the low-resolution image as an object region and deciding a region corresponding to the object region within the high-resolution image as a target region; and a correction step of extracting, by the processor of the image processing apparatus, a region from the high-resolution image of which the geometric distortion has been corrected.

16. The method according to claim 15, wherein in the correction step, the partial image, having a fan shape, is converted, by the processor of the image processing apparatus, into a partial image having a rectangular shape.

17. A non-transitory computer-readable storage medium storing a program for controlling a computer to execute:

an acquisition step of acquiring, by a processor of an image processing apparatus, a high-resolution image obtained from a broad-range image sensing unit, and a low-resolution image which corresponds to the high-resolution image and has a resolution lower than the high-resolution image, wherein each of the high-resolution image and the low-resolution image contains geometric distortions;

a detection step of detecting, by the processor of the image processing apparatus, an object in the low-resolution image;

a decision step of deciding, by the processor of the image processing apparatus, a region including the detected object within the low-resolution image as an object region and decides a region corresponding to the object region within the high-resolution image as a target region; and a correction step of extracting, by the processor of the image processing apparatus, an image region, from the image of which the geometric distortion has been corrected.

18. The medium according to claim 17, wherein in the correction step, the partial image, having a fan shape, is converted into a partial image having a rectangular shape.

19. An image processing apparatus comprising:

an acquisition unit that acquires a high-resolution image obtained from a broad-range image sensing unit, and a low-resolution image which corresponds to the high-resolution image and has a resolution lower than the high-resolution image, wherein each of the high-resolution image and the low-resolution image contains geometric distortions;

a detection unit that detects an object in the low-resolution image;

a decision unit that decides a region including the detected object within the low-resolution image as an object region and decides a region corresponding to the object region within the high-resolution image as a target region; and a recognition unit that extracts an image region, from the image of which the geometric distortion has been corrected and performs an object recognition processing for the extracted image of the region.

20. The apparatus according to claim 19, wherein said detection unit detects a moving object in the low-resolution image.

21. The apparatus according to claim 19, wherein the broad-range image sensing unit has an omni-directional mirror having a circular hyperboloidal, circular paraboloidal, or conical shape, or a fish-eye lens.

22. An image processing method executed by an image processing apparatus comprising:

an acquisition step of acquiring, by a processor of the image processing apparatus, a high-resolution image obtained from a broad-range image sensing unit, and a low-resolution image which corresponds to the high-resolution image and has a resolution lower than the high-resolution image, wherein each of the high-resolution image and the low-resolution image contains geometric distortions;

a detection step of detecting, by the processor of the image processing apparatus, an object in the low-resolution image;

a decision step of deciding, by the processor of the image processing apparatus, a region including the detected object within the low-resolution image as an object region and deciding a region corresponding to the object region within the high-resolution image as a target region; and a recognition step of extracting, by the processor of the image processing apparatus, an image of a region, from the image of which the geometric distortion has been corrected.

23. The method according to claim 22, wherein in the detection step, a moving object is detected, by the processor of the image processing apparatus, in the low-resolution image.

24. A non-transitory computer-readable storage medium storing a program for controlling a computer to execute:

an acquisition step of acquiring, by a processor of an image processing apparatus, a high-resolution image obtained from a broad-range image sensing unit, and a low-resolution image which corresponds to the high-resolution image and has a resolution lower than the high-resolution image, wherein each of the high-resolution image and the low-resolution image contains geometric distortions;

a detection step of detecting, by the processor of the image processing apparatus, an object in the low-resolution image;

a decision step of deciding, by the processor of the image processing apparatus, a region including the detected object within the low-resolution image as an object region and decides a region corresponding to the object region within the high-resolution image as a target region; and a recognition step of extracting, by the processor of the image processing apparatus, an image region, from the image of which the geometric distortion has been corrected.

25. The medium according to claim 24, wherein in the detection step, a moving object is detected in the low-resolution image.

* * * * *